Jan. 1, 1952 — J. CLARK — 2,580,407
PRESSURE OPERATED RESISTOR
Filed July 7, 1947 — 2 SHEETS—SHEET 1
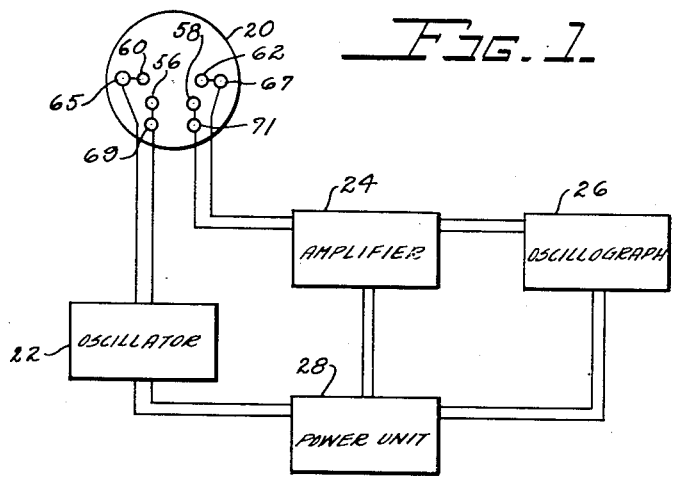
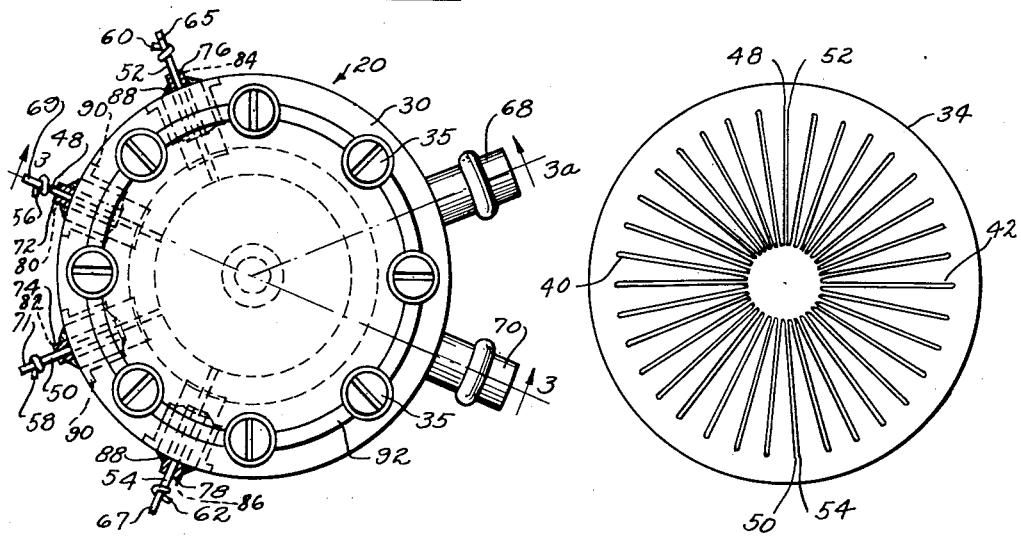
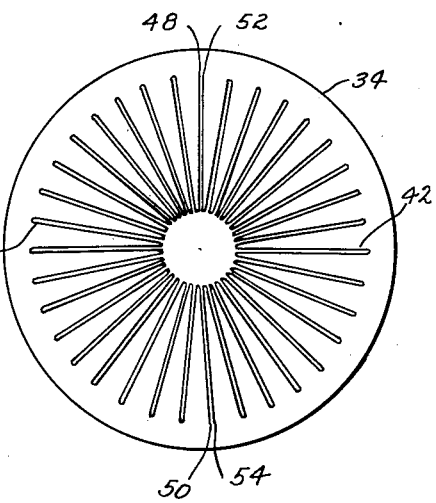
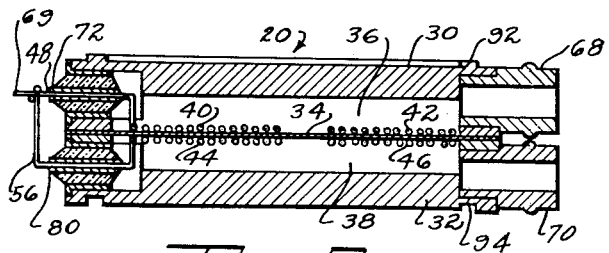
INVENTOR.
JAMES CLARK
BY Wade Loomly AND
Frederick W. Potterman
ATTORNEYS

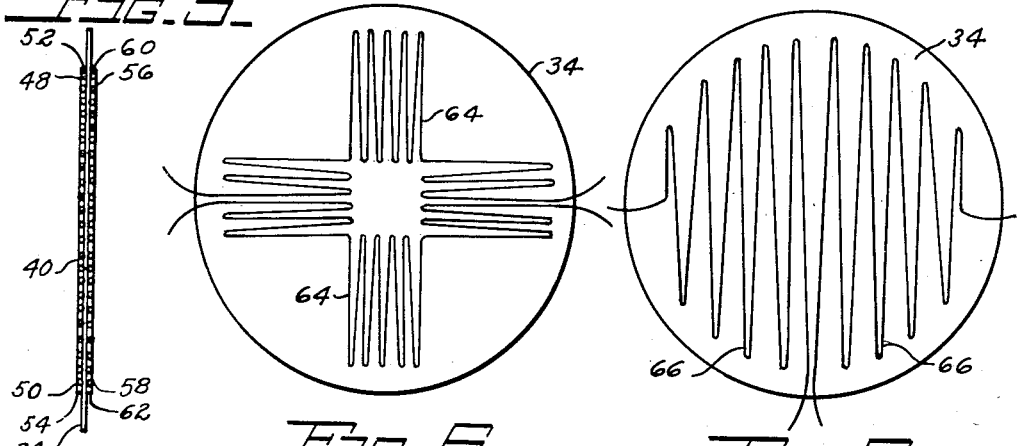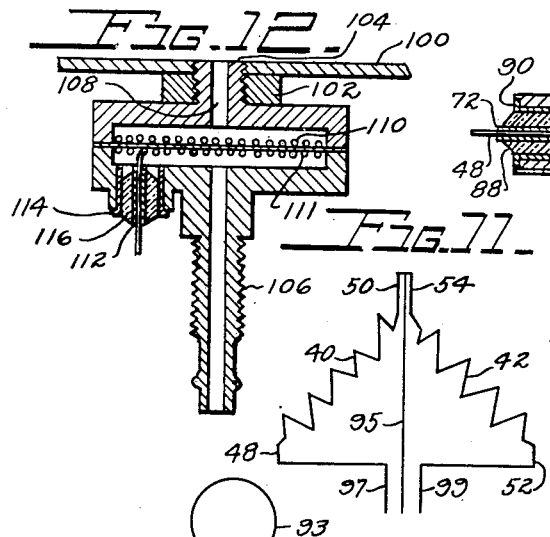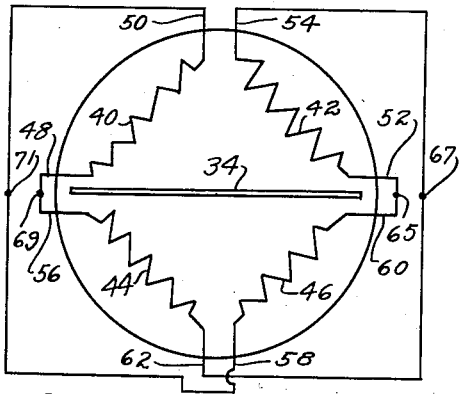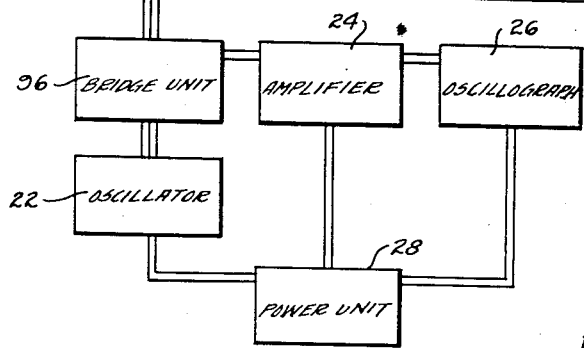

Patented Jan. 1, 1952

2,580,407

UNITED STATES PATENT OFFICE 2,580,407

PRESSURE OPERATED RESISTOR

James Clark, Dayton, Ohio

Application July 7, 1947, Serial No. 759,461

2 Claims. (Cl. 201—63)

(Granted under the act of March 3, 1883, as amended April 30, 1928; 370 O. G. 757)

The invention described herein may be manufactured and used by or for the Government for governmental purposes without payment to me of any royalty thereon.

This invention is a continuation-in-part of my copending application Serial No. 605,175, filed July 14, 1945, now Patent Number 2,507,501, issued May 16, 1950, and relates to a pressure measuring system and more particularly to equipment for measuring pulsating and steady pressures by electronic means.

It has been proposed to measure pulsating pressures by using pressure responsive diaphragms connected to sensitive carbon pile resistances whose output was recorded by an oscillograph. It was found, however, that where there is any appreciable diaphragm movement, the carbon granules tend to separate from each other, thus giving poor contact which has a non-linear resistance characteristic, or they may pack together, and refuse to follow the diaphragm pulsations. Moreover, upon repeated loading and unloading of the carbon granules which are in contact, the resulting abrasive action tends to pulverize them, whereby the clearance between the granules or carbon pile is continually raised.

The carbon pile devices above described are substantially an adaptation of the carbon button microphone which is used mainly where accurate response may be sacrificed for high output, as in throat microphones presently used by aircraft pilots.

It is also common practice in the art to connect pressure responsive diaphragms to velocity pickup units for picking up pulsating pressures, an example of this practice being the velocity microphone used in radio transmission, for which purpose the arrangement is highly desirable, since it operates upon a change in pressure. However, it will not operate on a constant pressure differential, and therefore cannot be used to pick up pressure differentials such as are encountered in aerodynamic and hydraulic flow. These pressure differentials are the differences between an unknown pulsating pressure and a known constant pressure, consisting of a steady or static pressure with a pulsating or dynamic pressure superimposed upon it. In order, therefore, to pick up these pressure differentials it is necessary for the pressure sensitive device to respond to the static pressure as well as the dynamic pressure.

It has also been proposed to use pressure responsive diaphragms as part of a variable condenser to pick up pressure pulsations. Such a variable capacity pickup, however, has the disadvantage that if it is used, in a D.-C. bridge it will only pick up the dynamic pressure, but will not pick up any static pressure differences since it responds only to a change in capacity. Moreover, if these capacity pickups are used in either a D.-C. bridge or an A.-C. bridge with an associate carrier system, it is necessary to have one stage of amplification adjacent to the pickup because of errors induced by the distributed capacitance of the leads to the condenser element, which results in a very large and bulky pickup which is impractical in aerodynamic and hydraulic applications.

Where optical systems with mirrors cemented to the pressure responsive diaphragm have been tried, the response to the device is so small for the pressure differentials being measured, that an elaborate optical system is required. The result is that, in most applications, the vibration of the component parts in the optical system causes a greater error than the response of the optical system to the movement of the pressure responsive diaphragm.

A "sylphon" with mirrors attached has been substituted for the flat diaphragm, but while it provides a greater deflection, the spring rate is so low that the resonant frequency is only from 10 to 20 cycles per second, which is entirely too low to measure the usual pulsating pressures encountered in aerodynamic and hydrodynamic flows. Moreover, the use of a "sylphon" in this situation is further limited because it expands and contracts with temperature changes which shifts the zero reference, whereby in wind tunnel and flight work the absolute value of the pressure differential is never certain since there is always a considerable temperature change with time in the wind tunnel and with altitude in flight work.

It is therefore an object of this invention to provide a device of the general character hereinbefore described but so constructed and arranged that it will accurately follow a pulsating pressure and will give a true value of the static and dynamic components of a pressure differential without shifting the zero reference in response to temperature changes.

Other objects and advantages will become evident as the invention is described in greater detail, reference being had to the drawings, wherein:

Fig. 1 is a schematic view of a pressure sensitive device and its associated equipment.

Fig. 2 is a top plan view of a pressure sensitive capsule showing a form of my invention wherein wire strain gauges are associated with a pressure sensitive diaphragm.

Fig. 3 is an axial section wherein the lower half is taken at 3—3 of Fig. 2 and the upper half at 3—3a of Fig. 2 showing the interior construction of Fig. 2.

Fig. 4 is a top plan view of a preferred form of strain gauge arrangement bonded to a diaphragm and adapted for use in a pressure sensitive capsule of the type shown in Figs. 2 and 3.

Fig. 5 is an edge view of the device of Fig. 4 showing the preferred form of diaphragm and the arrangement of the strain gauges and their leads.

Figs. 6 and 7 are plan views of diaphragms having other arrangements of the strain gauges mounted thereon.

Fig. 8 is a diagram showing how the wires of the strain gauges are connected and leads brought out for connection to the oscillator.

Fig. 9 shows a modified form of the device shown in Fig. 3.

Fig. 10 shows associate equipment for use with the device Fig. 9.

Fig. 11 shows how the terminals of the modification Fig. 9 are connected.

Fig. 12 is an elevation, partly in section of a strain gauge type of pressure sensitive capsule which is particularly adapted to mounting to the inside surface of an airfoil or hydrofoil, this form having an opening in the upper side to admit the unknown pulsating pressure on the upper side of the diaphragm and another opening to admit a reference pressure to the underside of the diaphragm.

Like reference characters refer to like parts throughout the several views.

Reference is made to Fig. 1, which is a diagrammatic representation showing how a pressure sensitive device 20, made according to this invention, is connected to its associated instruments. The pressure sensitive device 20 contains the four arms of an A.-C. bridge which are arranged to be affected by static or dynamic pressure variations received by the device. The bridge is energized by an oscillator 22, the output of the bridge being fed into an amplifier 24, and the output of the amplifier being fed into an indicating meter or recording oscillograph 26. Power for these electronic circuits is furnished by a source of supply 28. The oscillator 22, amplifier 24, meter or recording oscillograph 26, and power supply 28 are commercially obtainable instruments or equipment well known in the art.

The pressure sensitive device 20 may also be used in a D.-C. bridge or potentiometer circuit in connection with a D.-C. amplifier, all of which are well known in the art, to indicate or record steady and pulsating pressures.

The pressure sensitive capsule 20 shown in detail in Figs. 2 and 3 comprises a housing made in two parts 30 and 32 with a diaphragm 34 between them, the housing parts and diaphragm being clamped together by screws 35 or otherwise secured pressure tight whereby the interior of the housing is divided into two pressure tight chambers 36 and 38. Wire strain gauges 40, 42, 44, and 46 are cemented or otherwise bonded to the upper and lower sides of the diaphragm 34, the four ends 48, 50, 52, and 54 of the upper strain gauges 40 and 42 being brought through pressure sealed terminal means extending from the upper chamber 36 and the four ends 56, 58, 60 and 62 of the lower strain gauge 44 and 46 being brought through pressure sealed terminal means hereinafter described extending from the lower chamber 38, the terminal means being then connected in pairs as shown in Figs. 2 and 3 to provide four points for connection to the associated equipment Fig. 1. Fig. 4 shows the upper side and Fig. 5 the edge of the preferred form of diaphragm with the strain gauges bonded thereto.

Fig. 6 shows the upper side of the diaphragm 34 equipped with two strain gauges 64 of modified form while Fig. 7 shows a still further modification at 66, both modifications having two strain gauges bonded to each side and four ends for connection to the terminal means as in the case of Figs. 4 and 5.

The strain gauges shown in Figs. 4, 5, 6 and 7 may preferably be made by winding resistance wire on a form which may consist of a plurality of pins extending upward from a plane surface, the pins being positioned to produce the several configurations shown. A piece of thin paper or plastic foil may first be pressed down over the pins and the wire then wound and cemented to the paper or foil. After the cement has hardened, the gauge and paper or the foil, if that is used, are together lifted from the pins and transferred to and secured on the diaphragm, two gauges on each side thereof. It is noted that, other things being equal, the strain gauge shown in Figs. 4 and 5 is the most sensitive, since the more nearly the convolutions of the strain gauge are radially disposed on the diaphragm the greater the strain produced in the gauge wire by unit deflection of the diaphragm.

The direction of stress and consequently strain in any circular diaphragm clamped at the edge and uniformly loaded follows radial lines from the center of the diaphragm outward and becomes a maximum at a position adjacent the clamped edge. The equation for strain at the clamped edge of the diaphragm is:

$$e = \frac{3qr^2}{4h^2E}$$

wherein $e$=unit strain,
$q$=distributed load/unit area,
$r$=radius of free diaphragm,
$h$=thickness of diaphragm,
$E$=modulus of elasticity.

In order to design the most effective type of pickup unit for any purpose it is necessary to know the deflection at the center of the diaphragm for various loads. This may be expressed by the equation:

$$\delta_c = \frac{qr^4(1-\mu^2)}{5.33Eh^3}$$

wherein $\delta_c$=deflection at center of diaphragm,
$q$=pressure per unit area of diaphragm,
$r$=radius of free diaphragm,
$\mu$=Poisson's ratio.

In order that the output of the pressure sensitive capsule shown in either Fig. 2 or 3 may accurately portray any pulsating pressure which may be applied to it, it is necessary that the resonant frequency of its seismic system be higher than the frequency of any pulsating pressures which are to be measured. The seismic system of the pressure responsive capsule shown in Figs. 2 and 3 consists of the spring steel diaphragm 34 and the wire strain gauges 40, 42, 44 and 46. In designing this type of pressure responsive capsule it is required to select a diaphragm whose stiffness or spring rate and mass when substituted into the following equation will give a resonant frequency higher than the frequency of any pulsating pressures which are to be measured. In this equation:

$$f_{D_1} = \frac{10.21}{2\pi r^2} \sqrt{\frac{Eh^3 g}{12(1-\mu^2)\gamma h}}$$

$f_{D_1}$ = resonant frequency of diaphragm for wire strain gauges, cycles per second,
$r$ = radius of free diaphragm,
$E$ = modulus of elasticity,
$h$ = thickness of diaphragm,
$g$ = acceleration of gravity,
$\mu$ = Poisson's ratio,
$\gamma$ = weight/unit volume, density of diaphragm.

When a wire strain gauge is cemented or bonded to each side of a diaphragm they tend to stiffen the diaphragm, thus raising the resonant frequency. However, the mass which the gauges add to the diaphragm assembly tends to reduce the resonant frequency of the diaphragm assembly. In practice it has been found that the frequency rise due to the added stiffness just about compensates for the frequency drop due to the added mass, leaving the resonant frequency of the diaphragm with strain gauges mounted thereon substantially that of the original diaphragm itself.

Fig. 8 shows diagrammatically how the wire ends of the strain gauges are brought out through the terminal tubes in the housing and joined in pairs to provide four terminal points 65, 67, 69 and 71 adapted for connection to the associated equipment shown in Fig. 1.

Pressure tube connections 68 and 70 communicate respectively with the pressure chambers 36 and 38 above and below the diaphragm, one of the connections being adapted to receive a reference pressure and the other the dynamic or static pressure to be measured, or in lieu of a reference pressure, one chamber may be evacuated, in which case the measured pressure will be the absolute pressure, or one chamber may be provided with a selected reference pressure, and the other used to receive the pressure to be measured.

The pressure capsule hereinbefore shown and described with reference to Figs. 1 through 8 when used in a D.-C. bridge or potentiometer circuit in conjunction with an A.-C. amplifier to indicate and record the dynamic part of pressure differentials, is particularly valuable in measuring gun blasts or other high frequency pressure variations.

The eight circumferentially spaced terminal tubes 72, 74, 76, 78, 80, 82, 84 and 86 are preferably made of "Kover" alloy fitted into glass sleeves 88. The glass sleeves 88 are fitted into flanged bushings 90 also of "Kover" alloy, the "Kover" terminals, the glass sleeves and the "Kover" bushings being fused together. The "Kover" alloy terminals and bushing and the sleeve having the same coefficient of expansion are readily adapted to this procedure. The outside of the bushings 90 are copperplated and tinned and soldered into the housing parts thus providing a pressuretight seal for the terminals. Opposite ends 48, 50, 52, 54 of the strain gauges 40 and 42 are soldered to terminal tubes 72, 74, 76 and 78 respectively while opposite ends 56, 58, 60, 62 of the strain gauges 44 and 46 are connected to terminals 80, 82, 84 and 86 respectively.

The joints between the body portions and the diaphragms should be very carefully fitted for the reason that these joints must not only insure against leakage of the reference pressure and the pressure which is to be measured but must add a minimum of reluctance to the magnetic circuits. The reason for locating both the electrical terminals and the tube connections on the circumference of the housing instead of on the ends, is so that a number of the capsules may be stacked, one upon the other, as hereinafter described. Housing portion 30 is provided with an annular rib 92, and housing portion 32 with a mating annular groove 94, so that a number of the pressure capsules will be in axial alignment when stacked one on the other. The pitch diameter of the annular groove 94 coincides with the bolt circle of the screws 35, so that any force exerted in clamping together a stack of these capsules will not disturb the clamping of the diaphragm. The height of the annular rib 92 is greater than the depth of the annular groove 94 so that when a stack of the capsules is clamped together, the adjacent housing parts 30 and 32 only touch each other at the aligning annuli and thus eliminate any deflection of the housings of the several clamped together capsules, whereby there will be no change in the air gap between the several diaphragms and pole pieces due to the clamping.

Figs. 4 and 5 show the diaphragm with two strain gauges of preferred form on each side, thereby providing the eight wire ends which will be connected to the terminal tubes 72, 74, 76, 78, 80, 82, 84 and 86. The modified strain gauges shown in Figs. 6 and 7 also have eight ends, four on each side and will be connected in the same manner as the strain gauge shown in Fig. 4.

Fig. 9 shows how a capsule such as is shown in Fig. 3 may be modified to provide a capsule 93 by omitting the lower housing part 32 and securing the diaphragm 34 pressuretight to the rim of the upper housing part 30, the two strain gauges 40 and 42 remaining in the upper chamber 36 the same as in Fig. 3 and the four ends 48, 50, 52, 54 being brought out through the terminal tubes 72, 74, 76 and 78, which are jointed outside the housing as in Fig. 11 where the two ends 50 and 54 are joined to a common terminal 95, while the two ends 48 and 52 are joined to terminals 97 and 99 respectively thereby forming two of the arms of an A.-C. or D.-C. bridge.

The modification shown in Fig. 9 also requires a modified arrangement of the associated equipment. This as shown in Fig. 10 which, in addition to the equipment of Fig. 1, includes a bridge unit 96 which contains the other two arms of the bridge, the terminals of the capsule being connected as shown in Fig. 11.

A single pressure connection 68 is provided for the single chamber 36 within the capsule Fig. 9 and this chamber if desired, may be evacuated or provided with any other suitable reference pressure.

The pressure sensitive capsule shown in Fig. 12 is particularly adapted for measuring the pressure distribution on the surface of an airfoil. The skin 100 of the airfoil is provided on its underside with a nut 102 which is preferably soldered or welded thereto, the threaded hub 104 of the capsule being screwed into the nut 102. A pressure tube connection 106 is provided to admit a reference pressure, and an opening 108 through the threaded hub admits the surface pressure on the airfoil which is to be measured.

The two ends of the upper strain gauge 110 may be insulatedly brought through small holes in the diaphragm and pressure sealed, the two ends of the upper strain gauge 110 and the two ends of the lower strain gauge 111 then being brought out through terminal tubes 112 to which they are soldered. As an alternative the terminal tubes may be brought out laterally as shown in Fig. 3. "Kovor" alloy bushings 114 and glass sleeves 116 are employed as described relative to Figs. 3 and 9.

By thus mounting the pressure capsule directly beneath the airfoil surface, as in Fig. 12, the distance traversed by the pressure wave before it strikes the diaphragm is reduced to a minimum thus reducing time lag and pressure drop to a minimum, whereby high frequency pulsations in the air flow may be picked up. This type of installation is ideal for studying buffeting or unstable flow inwind tunnel or flight research work.

Having described my invention, I claim:

1. A device for translating fluid impulses into electrical impulses which comprises a hollow housing, a flat circular diaphragm secured at its periphery within the hollow of said housing so as to divide the interior of said housing into two pressuretight chambers, one for receiving a reference pressure and the other for receiving the pressure to be measured, two similar diametrically opposed strain gauge means in each of said chambers bonded to said diaphragm, pressure sealed means for insulatedly conveying the eight terminals of the four strain gauge means through the wall of said housing, a fluid pressure connection extending into each of said chambers, and means outside the housing connecting the eight terminals of the four strain gauge means into four pairs whereby said strain gauge means may compose the four arms of an A.-C. or D.-C. bridge.

2. A device for translating fluid impulses into electrical impulses which comprises a pair of hollow housing sections providing a hollow housing, a diaphragm secured at the periphery thereof between the hollow of said housing so as to divide the interior housing sections into two pressure-tight chambers, one for receiving a reference pressure and the other for receiving the pressure to be measured, two similar diametrically opposed strain gauge means in each of said chambers bonded to said diaphragm, pressure sealed means for insulatedly conveying the eight terminals of the four strain gauge means out through the wall of said housing, a pressure connection extending into each of said chambers and means outside of said chambers for appropriately connecting the eight terminals into four pairs whereby they may compose the four arms of an A.-C. or D.-C. bridge.

JAMES CLARK.

REFERENCES CITED

The following references are of record in the file of this patent:

UNITED STATES PATENTS

| Number | Name | Date |
| --- | --- | --- |
| 2,336,500 | Osterburg | Dec. 14, 1943 |
| 2,398,372 | Green | Apr. 16, 1946 |
| 2,400,467 | Ruge | May 14, 1946 |
| 2,405,199 | Faust et al. | Aug. 6, 1946 |
| 2,507,501 | Clark | May 16, 1950 |